C. BURNETT.
PNEUMATIC OR ELASTIC TIRE.
APPLICATION FILED MAR. 7, 1911.
1,091,480.
Patented Mar. 31, 1914.
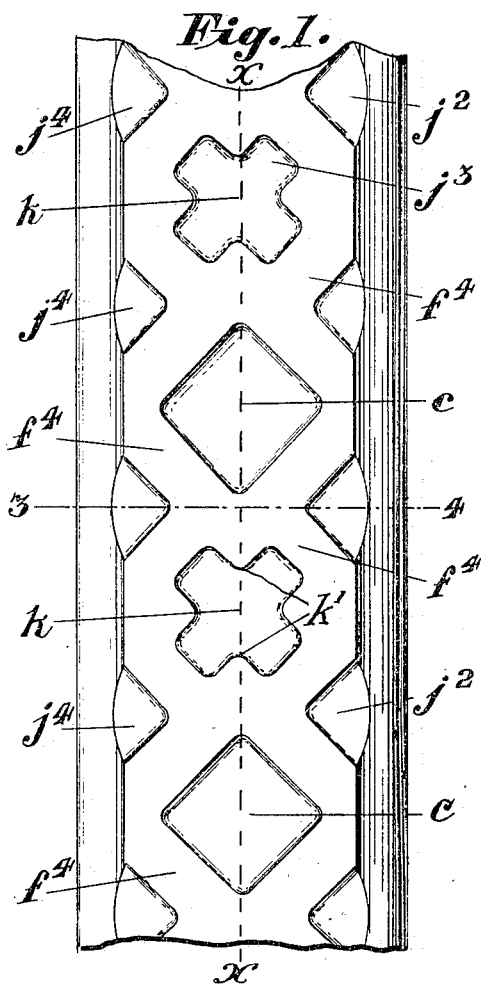
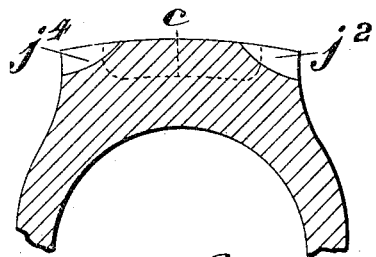

UNITED STATES PATENT OFFICE.

CUTHBERT BURNETT, OF DURHAM, ENGLAND.

PNEUMATIC OR ELASTIC TIRE.

1,091,480.

Specification of Letters Patent. Patented Mar. 31, 1914.

Application filed March 7, 1911. Serial No. 612,920.

*To all whom it may concern:*

Be it known that I, CUTHBERT BURNETT, a subject of the Kingdom of Great Britain, residing at Belmont House, Durham, in the county of Durham, England, engineer, have invented certain new and useful Improvements in or Relating to Pneumatic or Elastic Tires, of which the following is a specification.

This invention relates to improvements in resilient tires, and refers more particularly to the tread of tires such as are used on motor vehicles, tri-cars, motorcycles, and the like.

This invention provides a tread for vehicle tires which effectually provides against skidding or slipping in both a lateral and forward direction.

The present invention consists in the combination of a series of transverse ribs defining depressions, said depressions having the form of crosses or rhomboids. By this arrangement the said depressions are enabled to function as suction cups and appreciably tend to reduce the skidding and slipping of the vehicles to which the tires constructed according to my invention are applied. Also the said ribs furnish more effective gripping means than in the case with a smooth tread tire, due to the biting effect of the sharp edges and corners thereof.

In some cases it may be desirable to direct the transverse ribs at angles of a lesser or greater number of degrees than shown in the illustration, as by varying the size of the angles at which the ribs intersect the number of suction cups produced by the intersection of the ribs may be varied. For instance, if the angle of intersection be made smaller additional suction cups are available and a larger tread surface is presented to withstand the wear. In all cases a substantial body of the material comprising the tread is included in the transverse ribs, thereby enabling the tire to retain its tractive qualities even after having been subjected to considerable wear.

Referring to the drawings attached hereto and forming a part of this specification, and in which I illustrate the preferred embodiment of my invention:—Figure 1 is an elevational view of the portion of a tire constructed according to my invention. Fig. 2 is a transverse section on the line 3—4 of Fig. 1.

Referring to the drawing: The embodiment illustrated herein is constructed by arranging on the tread surface of the tire a series of transverse ribs 4 having their ends offset with respect to each other, in the manner illustrated. The said ribs intersect in the manner shown so as to define on the surface of the tread a series of suction cups $c$ having the rectangular form, and a series of suction cups $k$ having the form of a cross, the arms of the cross designated by the reference character $j^3$. These ribs also define, at the edge of the tread, a series of indentations $j^2$ and $j^4$. The suction cups have a tendency to hang to the ground as the wheel revolves, and also the edges of the ribs, which form the walls of the suction cups and indentations, bite into the ground. It will be seen that the combination of these two make an effective means for preventing skidding or slipping. The preferable arrangement of intersecting the ribs, which is shown in the drawing, produces the suction cups of the form shown, which are disposed alternately with respect to each other and diagonally with respect to the line of drive.

It will be obvious that although I have described and illustrated the suction cups, as being of square and rectangular configuration, these may be of any suitable shape depending on the angle and manner in which the ribs are made to intersect.

In all cases it will be understood that sufficient material is to be embodied in the ribs to present an effective tractive portion and to isolate the suction cups and thus preserve their internal vacuum after the tire has been subjected to considerable wear.

Having thus described my invention, what I claim is:—

A tire having a tread portion provided with raised sets of broad tread ribs extending in crossed relation with respect to each other from one lateral margin of the tire tread to the other, each rib having its ends offset with respect to each other, the ribs of one set crossing the ribs of the other set at the central line of drive of the tread and the ends of the ribs of one set merging with the ends of the ribs of the other set at the margins of the tire tread, the ribs of each set being substantially parallel and uniformly spaced apart from each other a distance exceeding the width of one rib, said ribs thereby forming a series of relatively spacious suction cups along the line of tread, the inner margins of the ribs and alternate cups having pointed projections extending toward the center of such cups, certain of said points coinciding with the line of drive and the remaining points projecting at an angle to the line of drive, substantially as described.

In witness whereof I have hereunto set my hand in the presence of two witnesses.

CUTHBERT BURNETT.

Witnesses:
H. NIXON,
E. ALEXANDER.